(12) United States Patent
Nakayama et al.

(10) Patent No.: US 7,206,095 B2
(45) Date of Patent: Apr. 17, 2007

(54) PRINTING APPARATUS AND METHOD

(75) Inventors: Toru Nakayama, Kanagawa (JP);
Sohei Tanaka, Kanagawa (JP);
Masafumi Wataya, Kanagawa (JP);
Noriyuki Suzuki, Tokyo (JP); Akira Kuronuma, Tokyo (JP); Takuji Katsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 878 days.

(21) Appl. No.: 10/083,510

(22) Filed: Feb. 27, 2002

(65) Prior Publication Data
US 2002/0118408 A1 Aug. 29, 2002

(30) Foreign Application Priority Data
Feb. 28, 2001 (JP) .............................. 2001-055464

(51) Int. Cl.
G06F 15/00 (2006.01)
G06K 1/00 (2006.01)
G06K 15/00 (2006.01)

(52) U.S. Cl. .................. 358/1.18; 358/1.12; 358/1.16; 358/1.18; 347/5; 347/40

(58) Field of Classification Search ............... 358/1.18
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitami et al. | 346/140 R |
| 4,723,129 A | 2/1988 | Endo et al. | 346/1.1 |
| 4,740,796 A | 4/1988 | Endo et al. | 347/1.1 |
| 5,816,714 A * | 10/1998 | Hori | 400/61 |
| 5,838,888 A * | 11/1998 | Oda | 358/1.16 |

(Continued)

FOREIGN PATENT DOCUMENTS

JP 54-56847 5/1979

(Continued)

*Primary Examiner*—King Y. Poon
*Assistant Examiner*—Yixing Qin
(74) *Attorney, Agent, or Firm*—Fitzpatrick, Cella, Harper & Scinto (57) ABSTRACT

Disclosed is a printing apparatus in which printing elements used in the printing of each raster can be set at will. The printing apparatus has a carriage equipped with a printhead having a plurality of printing elements arranged in a predetermined direction, and the carriage is made to scan across a printing medium in a direction that intersects the direction in which the printing elements are arranged, thereby performing printing on the medium. The printing elements are divided into a plurality of blocks each consisting of a predetermined number of successive printing elements, print data that has been transmitted in raster form is stored in a receive buffer, and data that has been stored in the receive buffer is divided and stored in a print buffer having a plurality of areas corresponding to the blocks of printing elements. In accordance with printing elements used in a scan, the data in a corresponding area of the print buffer is shifted and the areas of the print buffer and respective ones of the blocks are made to correspond in accordance with distance over which the printing medium is transported after a scan is performed. The amount of shift is then calculated.

11 Claims, 9 Drawing Sheets

U.S. PATENT DOCUMENTS

| | | | |
|---|---|---|---|
| 5,927,874 A * | 7/1999 | Kikuta et al. | 400/120.02 |
| 6,027,197 A | 2/2000 | Kaburagi et al. | 347/9 |
| 6,116,711 A | 9/2000 | Umezawa et al. | 347/14 |

FOREIGN PATENT DOCUMENTS

| | | |
|---|---|---|
| JP | 59-123670 | 7/1984 |
| JP | 59-138461 | 8/1984 |
| JP | 60-71260 | 4/1985 |
| JP | 07314785 A | 12/1995 |
| JP | 08-072330 A | 3/1996 |
| JP | 10-211722 A | 8/1998 |
| JP | 2000-318142 | 11/2000 |

* cited by examiner

PRINTING APPARATUS AND METHOD

FIELD OF THE INVENTION

This invention relates to a printing apparatus and printing method. More particularly, the invention relates to a printing apparatus and method in which a carriage equipped with a printhead having a plurality of printing elements arranged in a predetermined direction is made to scan across a printing medium in a direction that intersects the direction in which the printing elements are arranged, thereby performing printing on the medium.

BACKGROUND OF THE INVENTION

Printers for printing desired information such as text and images on a sheet-like printing medium such as paper or film are available as the information output devices of word processors, personal computers and facsimile machines, by way of example.

Various techniques are known for application to printing methods employed by printers. Ink-jet technology has become the focus of attention in recent years because of its ability to print on a printing medium such as paper without contacting the medium, the facility with which it lends itself to color printing and the quietness with which printing is performed. A serial printing method is employed most widely as the ink-jet printing method because of the advantages of lower cost and smaller size. The serial printing method employs a mounted printhead for jetting ink in accordance with desired print information. Printing is carried out while the printhead is scanned back and forth in a direction that intersects the direction in which the printing medium such as paper is fed.

The typical serial-type printer has a buffer memory for storing print data. Print data that has been stored in the buffer memory is transferred to the printhead and the printhead is made to scan in a main-scan direction to print on the printing paper.

The minimum unit of print data stored in the buffer memory is, e.g., 8 bits or 16 bits, and the data is handled unit by unit. The minimum unit (transport pitch) of transport distance of the printing medium is set to a distance for printing data in an amount that is a whole-number multiple of the minimum unit of print data.

With the conventional printer described above, the transport pitch of the printing medium is set together with the number of printing elements used in a single scan in each printing mode at the design stage of the printer. The transport pitch cannot be changed later. This means that the printing elements used in the printing of each raster is set permanently.

As a consequence, it is required that the mechanical parts and motors employed in the transport mechanism used in printers of the same model be of high precision with little variation from one to another. This raises the overall cost of the apparatus.

Further, it is not possible to change and update printing-mode specifications, e.g., to increase the number of scans made in multiple-pass printing. Furthermore, in a color printer having printheads with different numbers of printing elements, it is difficult to achieve agreement among the lengths of the printing areas (widths of the bands) of all colors in the direction of transport.

SUMMARY OF THE INVENTION

Accordingly, a first object of the present invention is to provide a printing apparatus in which the printing elements used in the printing of each raster can be set at will.

Another an object of the present invention is to provide a printing method through which the printing elements used in the printing of each raster can be set at will.

According to the present invention, the first object is attained by providing a printing apparatus in which a carriage equipped with a printhead having a plurality of printing elements arranged in a predetermined direction is made to scan across a printing medium in a direction that intersects the direction in which the printing elements are arranged, thereby performing printing on the medium, comprising, dividing means for dividing the printing elements into a plurality of blocks each consisting of a predetermined number of successive printing elements, a receive buffer for receiving print data that has been transmitted in raster form, a print buffer for dividing and storing the data, which has been stored in said receive buffer, in a plurality of areas corresponding to the blocks, data shifting means for shifting, in accordance with printing elements used in the scan, the data in the corresponding area of said print buffer, and control means for establishing correspondence between the areas of said print buffer and respective ones of the blocks in accordance with distance over which the printing medium is transported after the scan, and calculating the amount of the shift.

According to the present invention, the second object is attained by providing a printing method for performing printing by causing a carriage equipped with a printhead having a plurality of printing elements arranged in a predetermined direction to scan across a printing medium in a direction that intersects the direction in which the printing elements are arranged, thereby performing printing on the medium, comprising, a dividing step of dividing the printing elements into a plurality of blocks each consisting of a predetermined number of successive printing elements, a receive step of storing print data, which has been transmitted in raster form, in a receive buffer, a buffer step of dividing and storing the data, which has been stored in the receive buffer, in a print buffer having plurality of areas corresponding to the blocks, a data shifting step of shifting, in accordance with printing elements used in the scan, the data in the corresponding area of the print buffer, and a control step of establishing correspondence between the areas of the print buffer and respective ones of the blocks in accordance with distance over which the printing medium is transported after the scan, and calculating the amount of the shift.

Specifically, the present invention provides a printing apparatus in which a carriage equipped with a printhead having a plurality of printing elements arranged in a predetermined direction is made to scan across a printing medium in a direction that intersects the direction in which the printing elements are arranged, thereby performing printing on the medium. The printing elements are divided into a plurality of blocks each consisting of a predetermined number of successive printing elements, print data that has been transmitted in raster form is stored in a receive buffer, and data that has been stored in the receive buffer is divided and stored in a print buffer having a plurality of areas corresponding to the blocks of printing elements. In accordance with printing elements used in a scan, the data in a corresponding area of the print buffer is shifted and each area of the print buffer and each block are made to correspond in accordance with distance over which the printing medium is transported after a scan is performed. The amount of shift is then calculated.

If this arrangement is adopted, the amount of shift can be set in conformity with the distance of a single transport of the printing medium even in a case where the minimum unit of transport distance of the printing medium differs from one printing apparatus to another owing to, say, a variation in motors from one motor to another. As a result, a less costly motor can be used in controlling the transport of the motor.

Further, it is possible to change and update printing-mode specifications, e.g., to increase the number of scans made in multiple-pass printing. Furthermore, in a color printer having printheads with different numbers of printing elements, it is easy to achieve agreement among the lengths of the printing areas (widths of the bands) of all colors in the direction of transport.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In the embodiments set forth below, a printing apparatus using the ink-jet printing method will be described taking a printer as an example.

In this specification, "print" is not only to form significant information such as characters and graphics, but also to form, e.g., images, figures, and patterns on printing media in a broad sense, regardless of whether the information formed is significant or insignificant or whether the information formed is visualized so that a human can visually perceive it, or to process printing media.

"Print media" are any media capable of receiving ink, such as cloth, plastic films, metal plates, glass, ceramics, wood, and leather, as well as paper sheets used in common printing apparatuses.

Furthermore, "ink" (to be also referred to as a "liquid" hereinafter) should be broadly interpreted like the definition of "print" described above. That is, ink is a liquid which is applied onto a printing medium and thereby can be used to form images, figures, and patterns, to process the printing medium, or to process ink (e.g., to solidify or insolubilize a colorant in ink applied to a printing medium).

Portions Common to Embodiments

Figure 1:
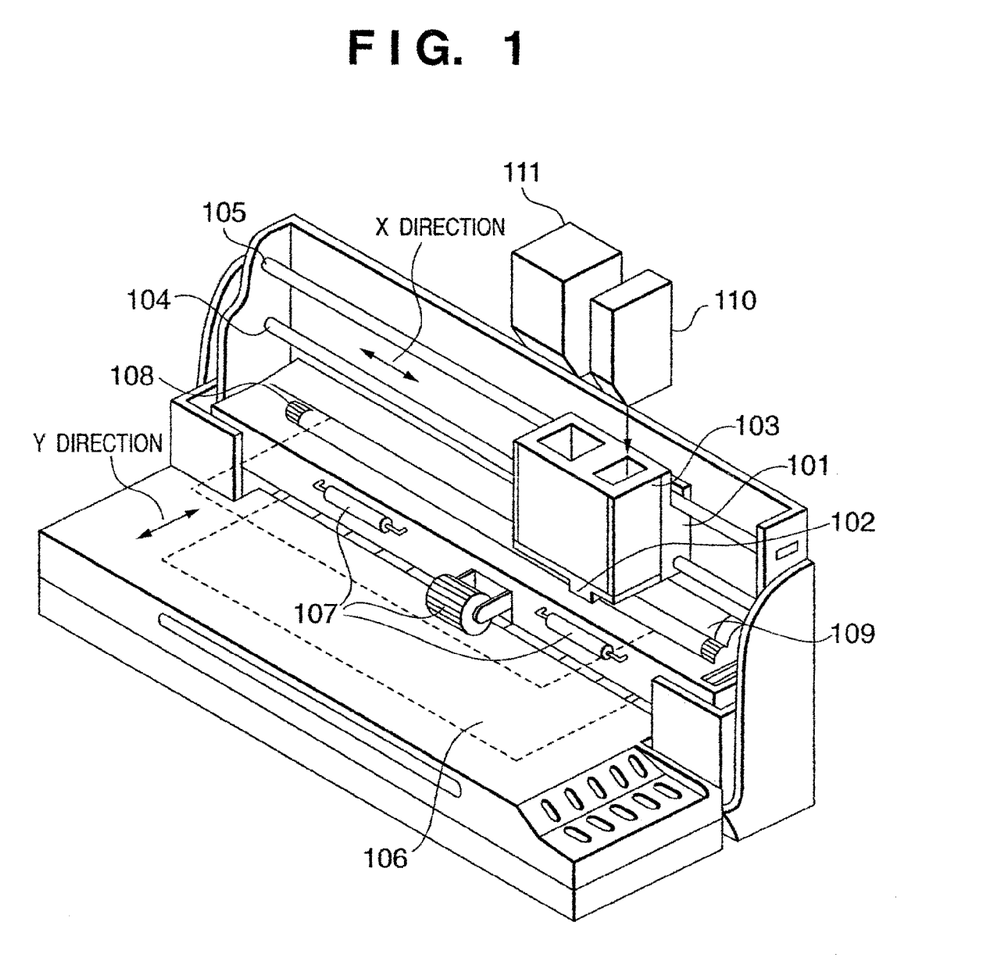
FIG. 1 is a perspective view illustrating the external appearance of an ink-jet printer used commonly in the embodiments of the present invention.

FIG. 1 is a perspective view illustrating the external appearance of an ink-jet printer used commonly in the embodiments of the present invention described below. This ink-jet printer is illustrated as having a structure in which both color printing and black-and-white monochrome printing can be performed. However, if the printer is considered as being an apparatus exclusively for black-and-white monochrome printing, the printhead will be equipped with only an ink cartridge containing black ink, as described below.

As shown in FIG. 1, a multinozzle printhead 102 having 320 black nozzles and 128 color nozzles and a cartridge guide 103 are mounted on a carriage 101. The printhead 102 ejects black (K) ink or cyan (C), magenta (M), yellow (Y) and black (K) inks. When the printer is to be operated, an ink cartridge 110 containing black ink and an ink cartridge 111 containing the inks of the other three colors are installed in the printhead 102. The cyan (C), magenta (M), yellow (Y) and black (K) inks are then supplied from ink cartridges. Drive signals for driving the nozzles of the printhead are supplied via a flexible cable (not shown) composed of an array of a number of conductors.

The carriage 101 is mounted on two guide rails 104 and 105. An endless belt 109 connected to the carriage 101 is driven by a carrier motor (described later), whereby the carriage 101 is driven back and forth along the X direction (referred to as the "main-scan direction" below). A transport roller 108 is driven by a transfer motor (described later), whereby printing paper 106 serving as the printing medium is transported along the Y direction (referred to as the "sub-scan direction" below).

Figure 2:
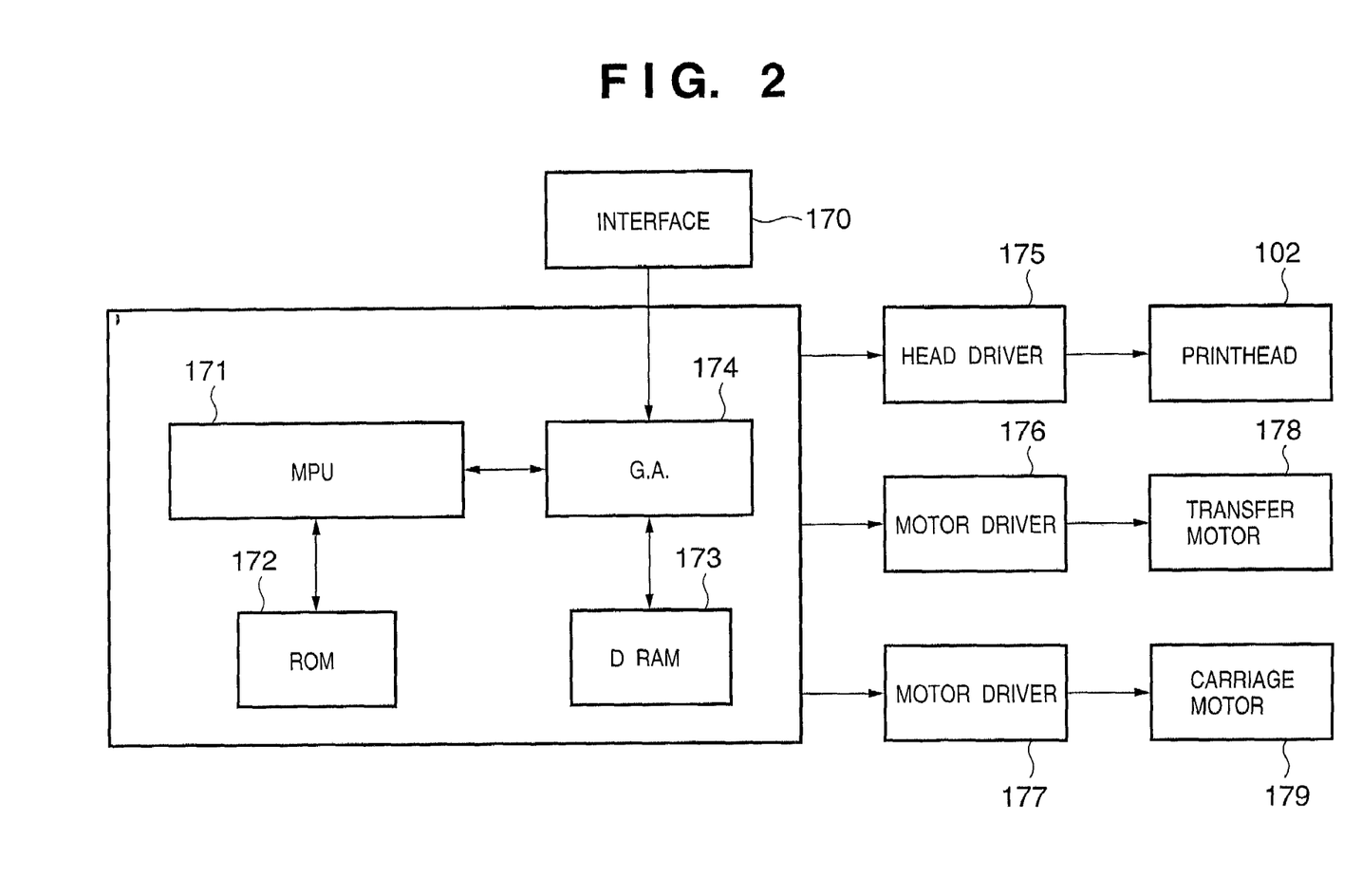
FIG. 2 is a block diagram illustrating the structure of control circuit of the ink-jet printer shown in FIG. 1.

FIG. 2 is a block diagram showing the arrangement of a control circuit of the ink-jet printer. Referring to FIG. 2, reference numeral 170 denotes an interface for inputting a print signal from an external unit such as a host computer; 171, an MPU; 172, a ROM for storing a control program (including character fonts if necessary) executed by the MPU 171; and 173, a DRAM for storing various data (the print signal, print data supplied to the printing head and the like). Reference numeral 174 denotes a gate array (G. A.) for performing supply control of print data to the printing head 102. The gate array 174 also performs data transfer control among the interface 170, the MPU 171, and the RAM 173. Reference numeral 179 denotes a carrier motor for transferring the printing head 102 in the main scanning direction; and 178, a transfer motor for transferring a paper sheet. Reference numeral 175 denotes a head driver for driving the printing head; and 176 and 177, motor drivers for driving the transfer motor 178 and the carrier motor 179.

The operation of the above control arrangement will be described below. When a print signal is inputted into the interface 170, the print signal is converted into print data for a printing operation between the gate array 174 and the MPU 171. The motor drivers 176 and 177 are driven, and the printing head is driven in accordance with the print data supplied to the head driver 175, thus performing the printing operation.

Though the control program executed by the MPU 171 is stored in the ROM 172, an arrangement can be adopted in which a writable storage medium such as an EEPROM is additionally provided so that the control program can be altered from a host computer connected to the ink-jet printer.

First Embodiment

A first embodiment of the present invention will now be described. In this embodiment, the above-described ink-jet printer is used as a black-and-white monochrome printer. A case in which monochrome images and characters are printed on the printing paper 106 by this apparatus will now be described.

Figure 3:
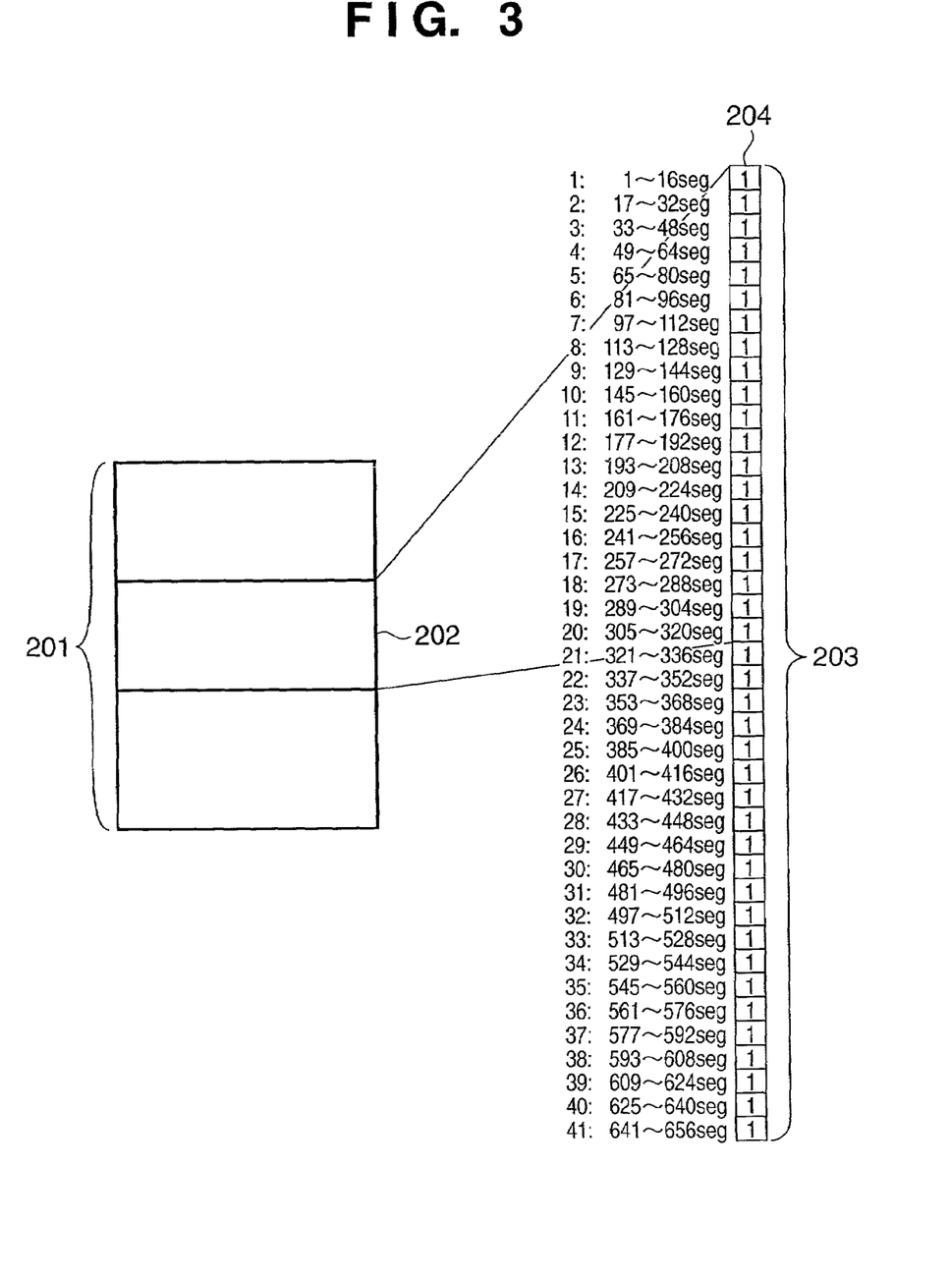
FIG. 3 is a diagram showing the relationship between areas printed by a single scan of the printhead and print-buffer management table according to a first embodiment.

FIG. 3 is a diagram illustrating the relationship between a printable area 201 on the printing paper 106 and an area (a single-scan print area) 202 printed on the printing paper 106 by a single scan of the printhead in the main-scan direction.

In this embodiment, data to be printed in the single-scan print area 202 is stored temporarily in a print buffer (the details of which will be described later) having a plurality of areas. A print-buffer management table 203 of the kind shown in FIG. 3 is used to manage utilization of the plurality of areas of the print buffer. The print-buffer management table 203 has cells 204 in each of which is stored a flag indicating, by a "1" or a "0", whether or not data is present in respective areas of the print buffer. One print-buffer area corresponds to one block of 16 nozzles of the printhead.

In the ink-jet printer of this embodiment, the overall print buffer is divided into 41 areas and 20 of these buffer areas are used to print in the single-scan print area. Accordingly, the print-buffer table has 41 cells. Further, the print-buffer management table has a ring-shaped structure and the 41 areas of the print buffer are used cyclically.

The printhead, on the other hand, has 320 nozzles arranged in the sub-scan direction. The print-buffer management table 203, therefore, can manage the print-buffer areas necessary to scan the printhead twice.

Figure 4:
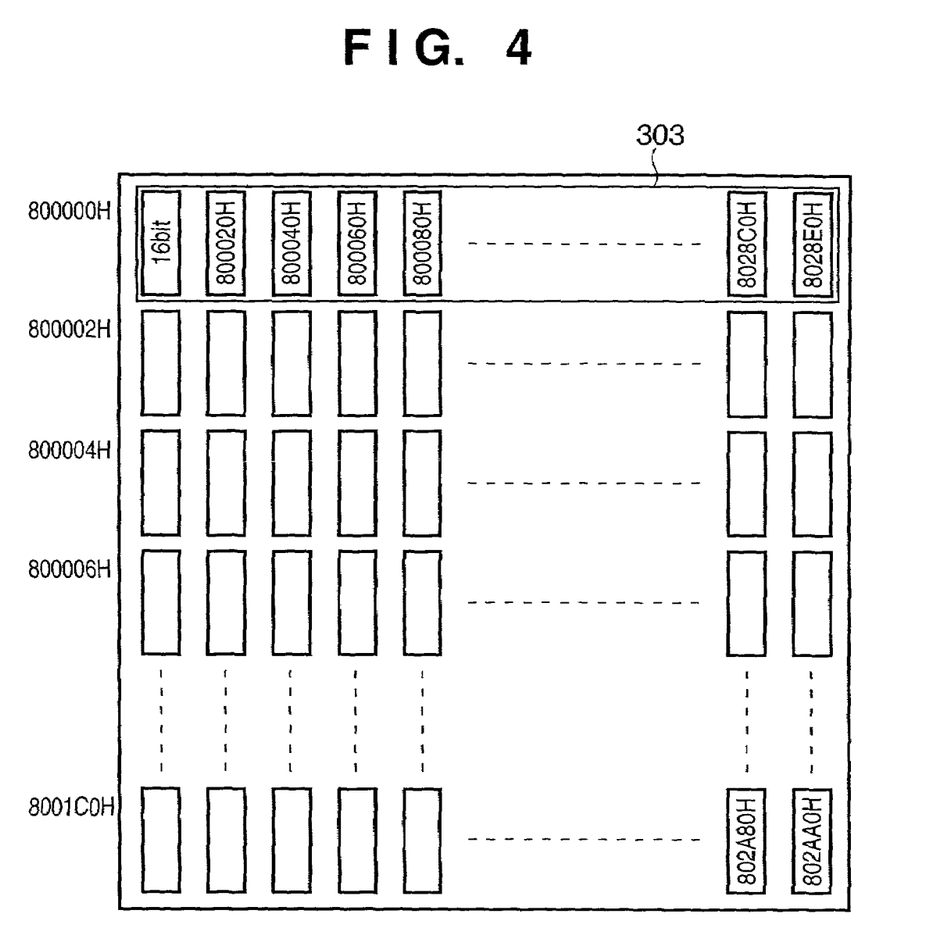
FIG. 4 is a diagram showing the internal structure of the print buffer according to the first embodiment.

FIG. 4 is a diagram illustrating the internal structure of the print buffer. The print-buffer areas necessary for the single-scan print area possess a memory capacity needed to print 16 bits (one word) of data along the vertical (sub-scan) direction over a horizontal width (210 mm) of size A4 paper at a printing density of 600 dpi in the horizontal (main-scan) direction. In other words, the print-buffer areas have a data-write area 303 of approximately 10 KB.

Further, each area of the print buffer is assigned a unique buffer ID number (0, 1, 2, . . . , N). As shown in FIG. 4, the print buffer has memory address "800000H" (H: hexadecimal notation) of DRAM 173 as its starting address, and the DRAM is divided into successive memory areas each of which is allocated as an individual print-buffer area. If such memory allocation is performed with regard to successive addresses starting from the starting address, the leading address of a print-buffer area having any ID number in the DRAM 173 will be 800000(H)+ID number×2(H).

In order to manage the position of the print-buffer area used, the DRAM 173 is provided with the above-mentioned management table and an area for storing a leading buffer ID number. This area manages the ID number of the print-buffer area to be used next. ID numbers stored in this area are updated successively by writing print data to a print-buffer area and therefore the ID number of the print-buffer area to be used next at any time will always be set in this area. Thus, in which print-buffer area data should be written is managed at all times during a printing operation. This information is held during a series of printing operations.

The ID number returns to 0 following the final ID number in order that the print-buffer areas may be arranged in a ring structure as mentioned above. The print-buffer areas are thus used cyclically any number of times during a series of printing operations.

In this embodiment, an assignment register having 21 areas of the same size as the print buffer is provided in order to store print data used in a single scan. Transferred to and held in each area of the assignment register is data of the corresponding area of the print buffer.

Furthermore, a register for printhead transfer is provided in order to achieve matching between the amount of transport of the printing paper and the corresponding nozzle position of the printhead. Data that has been shifted any number of bits from the assignment register in the transport direction of the printing paper is stored in this transfer register in accordance with a CPU command. The data in the transfer register is sent to the printhead in accordance with the print timing and printing is performed by ejecting ink from each of the nozzles in accordance with this data.

Figure 5:
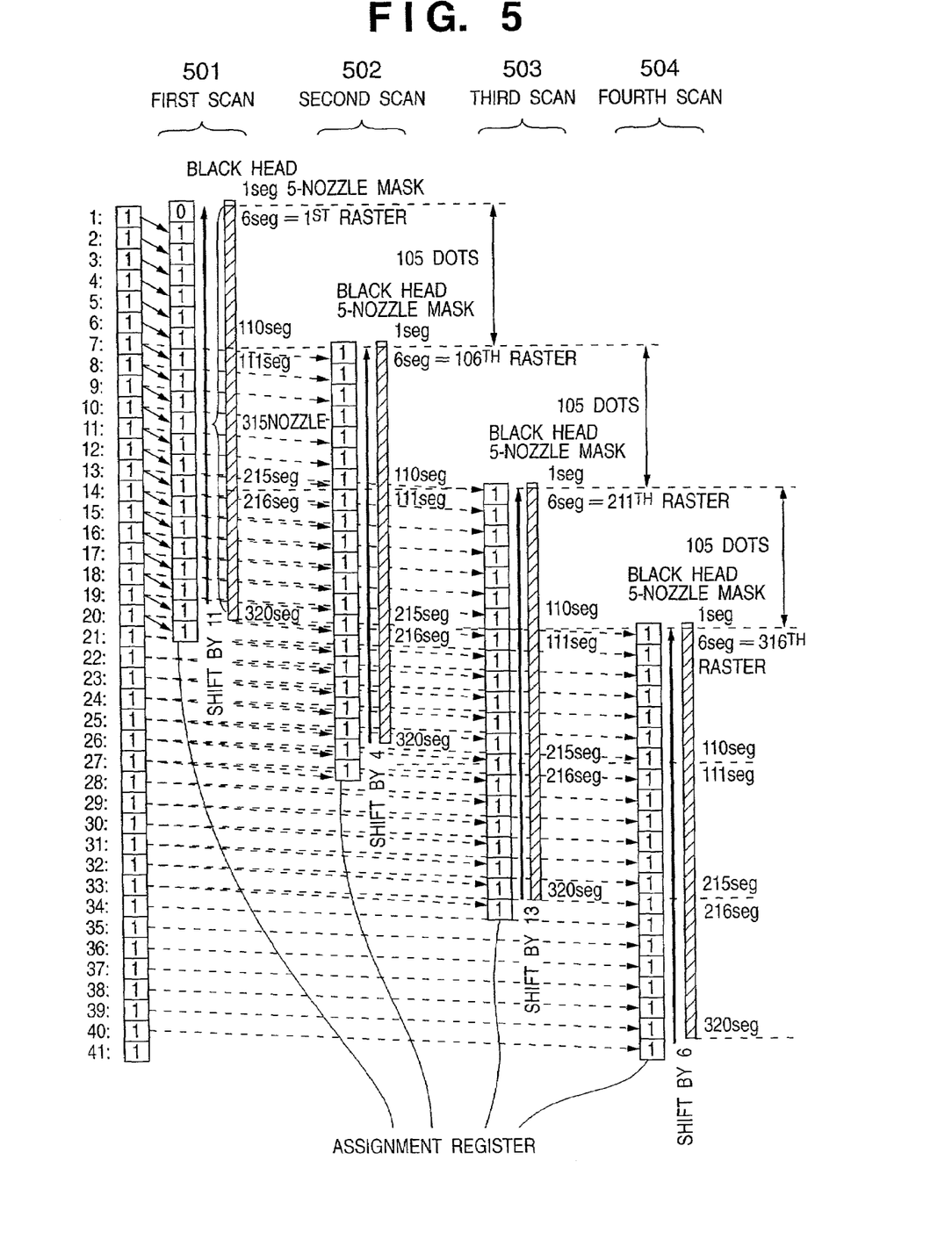
FIG. 5 is a diagram illustrating a management table and nozzles used in each pass of printing when three-pass printing is carried out according to the first embodiment.

FIG. 5 is a diagram illustrating the amount of transport of the printing paper and the position of print data of the printhead in each scan in a case where printing is performed by three-pass printing in which each print area is printed on the printing paper 106 by three scans.

Described here will be the operation in each scan in a case where the amount of transport of the printing paper a single time between passes is 105 rasters (dots) and the number of printhead nozzles used is 315. In this case, the first to fifth nozzles of the first block of the printhead are not used.

In a first scan 501, data that has been stored in print-buffer areas of numbers 1 to 20 in the management table is used. First, the data that has been stored in the areas 1 to 20 of the print buffer is transferred to the assignment register. In order to adjust the printing position, the data is shifted toward the upper side of the printing paper 106 by an amount equivalent to 11 nozzles and is held in the transfer register. The data in the transfer register is transferred to the printhead, whereby printing is performed.

In a second scan 502, data that has been stored in print-buffer areas of numbers 7 to 27 in the management table is used. First, since the data in the areas 1 to 6 of the print buffer has become unnecessary, it is so arranged that this data in the management table is made "0" and the next item of data is written in. Next, the data that has been stored in areas 7 to 27 of the print buffer is transferred to the assignment register. In order to adjust the printing position, the data is shifted toward the upper side of the printing paper 106 by an amount equivalent to four nozzles and is held in the transfer register. The data in the transfer register is transferred to the printhead, whereby printing is performed.

In a third scan 503, data that has been stored in print-buffer areas of numbers 13 to 33 in the management table is used. First, since the data in the areas 7 to 12 of the print buffer has become unnecessary, it is so arranged that this data in the management table is made "0" and the next item of data is written in. Next, the data that has been stored in areas 13 to 33 of the print buffer is transferred to the assignment register. In order to adjust the printing position, the data is shifted toward the upper side of the printing paper 106 by an amount equivalent to 13 nozzles and is held in the transfer register. The data in the transfer register is transferred to the printhead, whereby printing is performed.

In a fourth scan 504, data that has been stored in print-buffer areas of numbers 20 to 40 in the management table is used. First, since the data in the areas 13 to 19 of the print buffer has become unnecessary, it is so arranged that this data in the management table is made "0" and the next item of data is written in. Next, the data that has been stored in areas 20 to 40 of the print buffer is transferred to the assignment register. In order to adjust the printing position, the data is shifted toward the upper side of the printing paper 106 by an amount equivalent to six nozzles and is held in the transfer register. The data in the transfer register is transferred to the printhead, whereby printing is performed.

Thenceforth, and in similar fashion, the print-buffer management data and the amounts of nozzle shift are set in conformity with the positions of the printhead nozzles used and printing is performed scan by scan.

Figure 9:
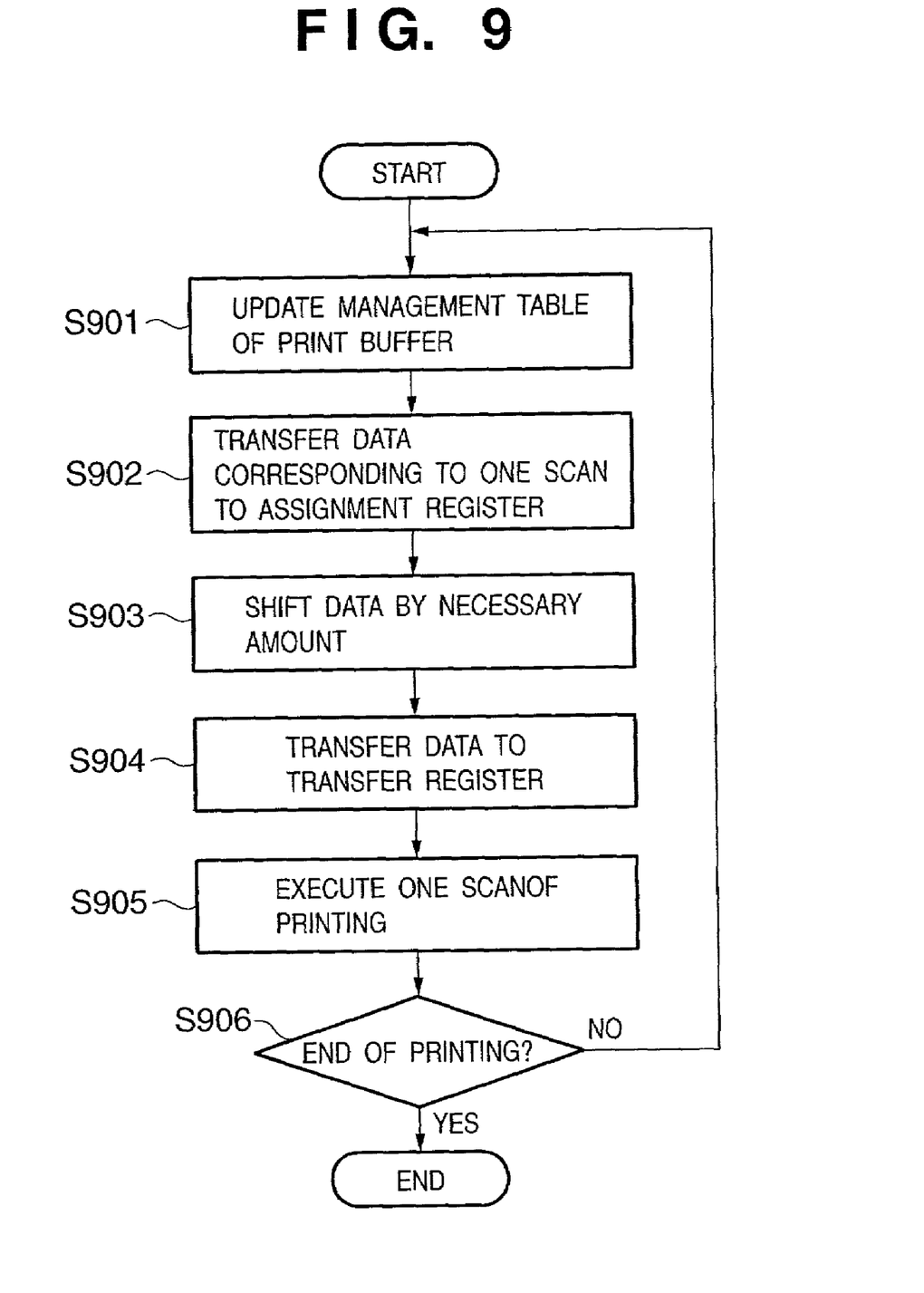
FIG. 9 is a flowchart illustrating data processing in the printing operation according to the first embodiment.

The operation in each scan according to this embodiment will be described again with reference to the flowchart of FIG. 9.

First, the print-buffer management table and the data in the area that stores the leading buffer ID number are updated (step S901). More specifically, the data of the management table in an area that has become her unnecessary because it has already been used for printing is made "0", the next item of data is written in and the ID number of the buffer area used in the next is set.

Next, the data in the print-buffer areas corresponding to one scan is transferred to the assignment register (step S902). In order to adjust the printing position, the data is shifted the necessary amount (step S903) and the result is transferred to and held in the transfer register (step S904).

Following the above processing, the data is transferred from the transfer register to the printhead at the predetermined timing and printing of one scan is performed (step S905). When the printing of one scan ends, it is determined whether the printing of one page has ended (step S906). If the printing of one page has not ended ("NO" at step S906), control returns to step S901.

Thus, in accordance with this embodiment, whenever the printing paper is transported, the data in the management table of the print buffer that stores the print data and the amount of shift of the print data with respect to the nozzles used are set, thereby making it possible to print data at the optimum printhead position of use made to conform to the amount of transport of the printing paper.

Second Embodiment

A second embodiment of the present invention will now be described. The second embodiment is substantially similar to the ink-jet printer of the first embodiment but differs in that color printing is possible. The portions that differ from the first embodiment will be the focus of the description with regard to a case where color images or characters are printed on the printing paper 106 by this apparatus.

Figure 6:
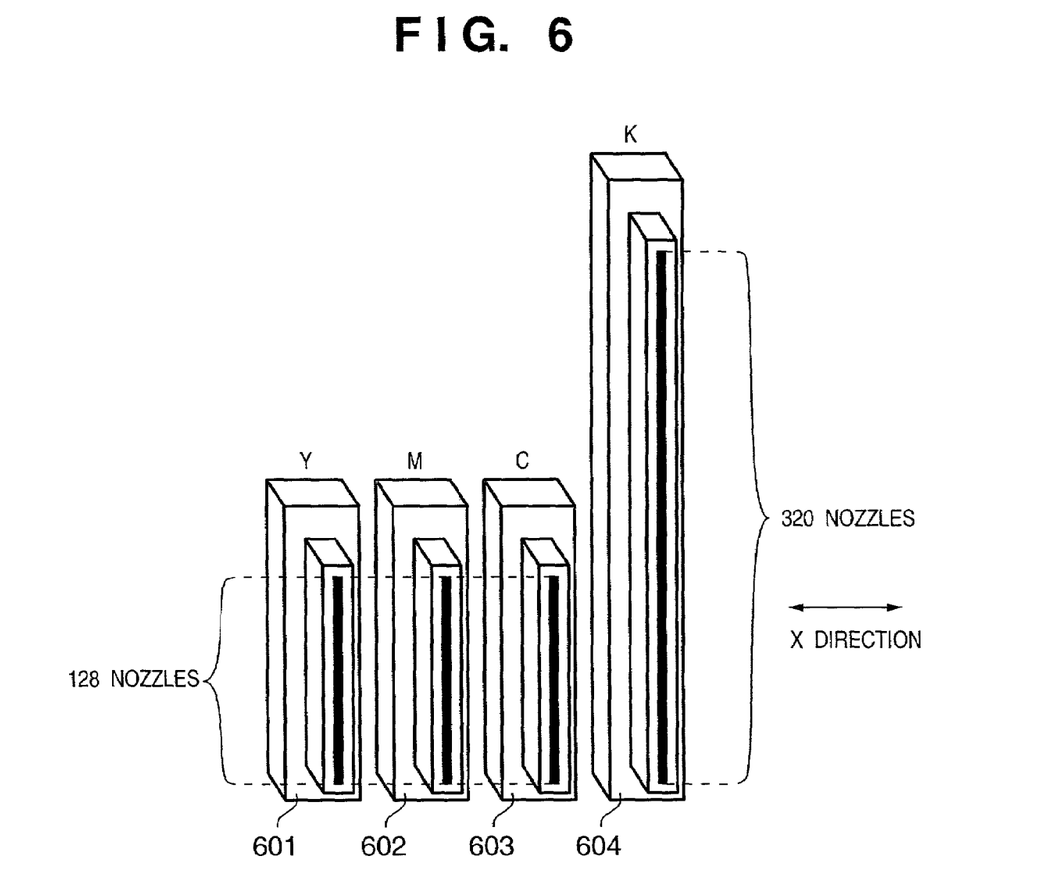
FIG. 6 is a perspective view illustrating the external appearance of a printhead according to a second embodiment as viewed from the side of the printing paper.

FIG. 6 is a perspective view illustrating the external appearance of the printhead 102, which is capable of color printing, used in the second embodiment as viewed from the side of the printing paper 106. The color printhead includes a printhead (referred to as a "Y head") 601 for ejecting yellow ink, a printhead (referred to as an "M head") 602 for ejecting magenta ink, a printhead (referred to as a "C" head") 603 for ejecting cyan ink, and a printhead (referred to as a "K head") 604 for ejecting black ink.

The heads mentioned above are mounted along the main-scan (X) direction and the heads are capable of forming color characters and images on printing paper by jetting ink droplets simultaneously. Each of the C, M and Y heads is provided with 128 ink-ejecting nozzles and the K head is provided with 320 ink-ejecting nozzles.

Figure 7:
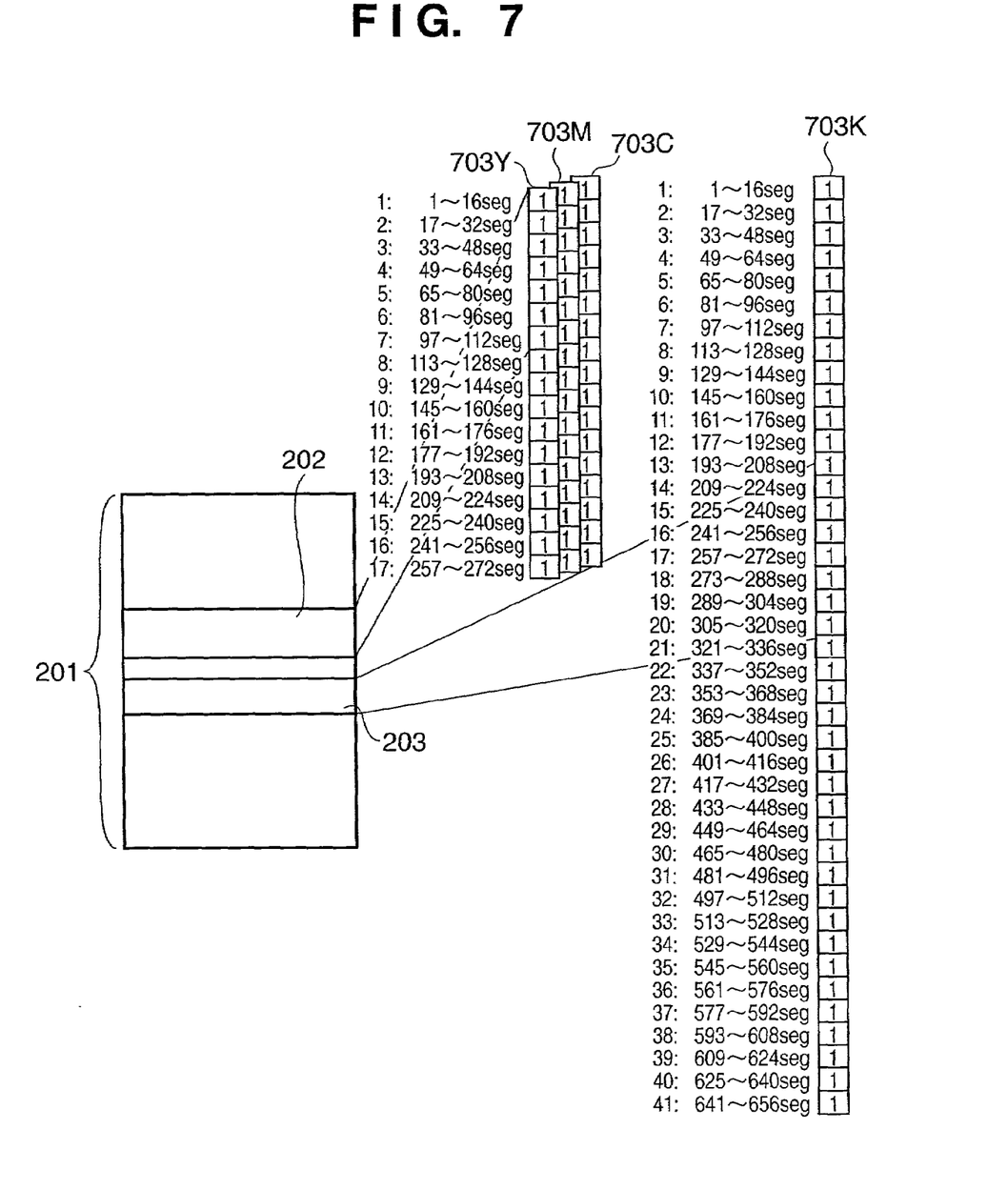
FIG. 7 is a diagram showing the relationship between areas printed by a single scan of the printhead and print-buffer management table according to a the second embodiment.

FIG. 7 is a diagram illustrating the relationship between the printable area 201 on the printing paper 106, the area (single-scan print area) 202 printed on the printing paper 106 using the cyan, magenta and yellow inks by a single scan of the printhead in the main-scan direction, and an area (a single-scan print area) 203 printed on the printing paper 106 using the black ink by a single scan of the printhead in the main-scan direction.

In order to print in the single-scan print area, this embodiment is such that a print buffer, which is for temporarily storing data printed on the printing paper, is provided for each ink. Four print-buffer management tables 702Y, 702M, 702C, 702K are used in association with the Y, M, C, K heads, respectively, to manage utilization of each print buffer.

The four print-buffer management tables 702Y, 702M, 702C, 702K have cells 703Y, 702M, 702C, 702K, respectively, in each of which is stored a flag ("1" or "0") indicating whether or not data is present in the print buffer. The cells correspond to the nozzle of the respective printheads. In the ink-jet printer of this embodiment, the print-buffer management tables of the color inks each have 17 cells, and the print-buffer management table of the black ink has 41 cells. Further, the print-buffer management tables have a ring-shaped structure and are used cyclically.

Each of the cyan, magenta and yellow heads has 128 nozzles arranged in the sub-scan direction and the black head has 320 nozzles arranged in the sub-scan direction. The print-buffer management tables 702Y, 702M, 702C, 702K, therefore, can manage the print-buffer areas necessary to scan the printhead twice.

The internal structure of the print buffers is similar to that shown in FIG. 4 described in connection with the first embodiment. That is, each print buffer possesses a memory capacity needed to print 16 bits (one word) of data along the vertical (sub-scan) direction over a horizontal width (210 mm) of size A4 paper at a printing density of 600 dpi in the horizontal (main-scan) direction. In other words, each print buffer has a data-write area 303 of approximately 10 KB.

Further, each print buffer is assigned a unique buffer ID number (0, 1, 2, . . . , N). As shown in FIG. 4, each print buffer has memory address "800000H" (H: hexadecimal notation) of DRAM 173 as its starting address, and the DRAM is divided into successive memory areas, in units of 10 KB, each of which is allocated as an individual print buffer. If such memory allocation is performed with regard to successive addresses starting from the starting address, the leading address of a print buffer having any ID number in the DRAM 173 will be 800000(H)+ID number×2(H) for cyan, 900000(H) +ID number×2(H) for magenta, A00000 (H)+ID number×2(H) for yellow and B00000(H)+ID number×2(H) for black.

In order to manage the order of the print buffers used, the DRAM 173 is provided with the above-mentioned management tables for respective ones of the colors and an area for storing a leading buffer ID number. This area manages the ID number of the print buffer to be used next. ID numbers stored in this area are updated successively by writing print data to the print buffer and therefore the ID number of the print-buffer area to be used next at any time will always be set in this area. Further, when print data of a predetermined number of pages ends, the ID number of the initial print-buffer area is set as the buffer area used next. Thus, in which print-buffer area data should be written is managed at all times during a printing operation. This information is held during a series of printing operations.

The ID number returns to 0 following the final ID number in order that the print-buffer areas may be arranged in a ring structure as mentioned above. The print-buffer areas are thus used cyclically any number of times during a series of printing operations.

The print-buffer management tables 702Y, 702M, 702C and 702K in this embodiment differ from the print-buffer management table 203 of the first embodiment only in that they are provided independently for respective ones of the printheads; the way in which the print buffers are managed is the same.

Figure 8:
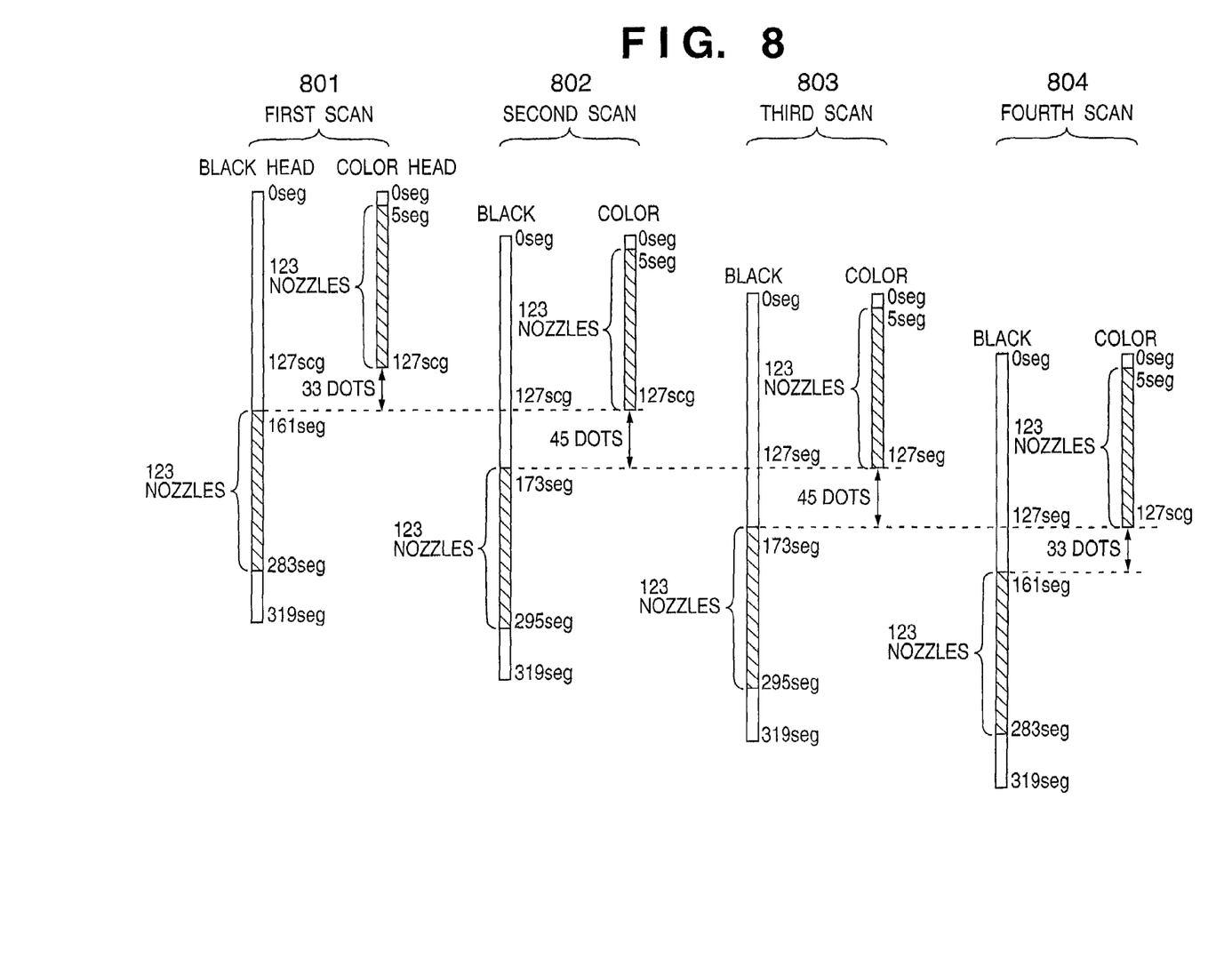
FIG. 8 is a diagram illustrating a management table and nozzles used in each pass of printing when three-pass printing is carried out according to the second embodiment.

FIG. 8 is a diagram illustrating the amount of transport of the printing paper and the position of print data of the printhead in each scan in a case where color printing is performed by three-pass printing in which each print area is printed on the printing paper 106 by three scans.

Described here will be the operation in each scan in a case where the amount of transport of the printing paper a single time between passes of scans one to three is 33, 45, 45 rasters (dots), respectively, and the number of printhead nozzles used in each scan is 123. In this case, the first to fifth nozzles of the first block of the color printhead are not used.

In a first scan 801, data that has been stored in print-buffer areas of numbers 1 to 20 in the management table is used. First, the data that has been stored in the areas 1 to 20 of the print buffer is transferred to the assignment register. In order to adjust the printing position, the data is shifted toward the upper side of the printing paper 106 by an amount equivalent to 11 nozzles and is held in the transfer register. The data in the transfer register is transferred to the printhead, whereby printing is performed.

In the first scan 801, the C, Y and M heads each use nozzles of 5 to 127 segments and the K head uses nozzles of 161 to 283 segments. The management tables and amounts of nozzle shift are set in conformity with these nozzles used.

In a second scan 802, the C, Y and M heads each use nozzles of 5 to 127 segments and the K head uses nozzles of 161 to 295 segments. The management tables and amounts of nozzle shift are set in conformity with these nozzles used.

In a third scan 803, the C, Y and M heads each use nozzles of 5 to 127 segments and the K head uses nozzles of 173 to 295 segments. The management tables and amounts of nozzle shift are set in conformity with these nozzles used.

In a fourth scan 804, the C, Y and M heads each use nozzles of 5 to 127 segments and the K head uses nozzles of 161 to 283 segments. The management tables and amounts of nozzle shift are set in conformity with these nozzles used.

Thenceforth, and in similar fashion, the management tables and the amounts of nozzle shift are set in conformity with the positions of the printhead nozzles used.

In accordance with this embodiment, as described above, in a printing apparatus having a plurality of printheads the numbers of nozzles of which differ, the position of print data used in a print-data management table and the amount of shift of a print data with respect to the nozzles used are set whenever the printing paper is transported, thereby making it possible to print data at the optimum printhead position of use made to conform to the amount of transport of the printing paper.

Accordingly, when a color printout is performed, the widths of the bands of all colors of the color print data printed on printing paper can be made to conform and it is possible to improve printing quality.

OTHER EMBODIMENT

In the embodiments described above, the structure of the printhead is such that the printhead has nozzles capable of printing 16 bits of data, in the sub-scan direction, in connection with each color component. However, this arrangement does not impose a limitation upon the invention. For example, if nozzle size is such that ready access can be made from an MPU, then any size such as 8, 16 or 32 bits may be used. Further, in the above embodiments, it is so arranged that the provided management table has a size smaller than that of the printing paper. However, this arrangement does not impose a limitation upon the invention. For example, no difficulties arise and there is no difference in effects if the management table has a size greater than one page. In addition, the number of print buffers and the print-buffer size are not limited by the examples set forth in the above embodiments, and it goes without saying that these can be changed depending upon the structure of the apparatus, etc.

Further, the invention has been described taking as an example a printer that performs printing in accordance with the ink-jet method. However, the present invention is applicable similarly to a printing apparatus that prints in accordance with another method so long as the printing apparatus is of the serial printing type.

Each of the embodiments described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, not only an exchangeable chip type printhead, as described in the above embodiment, which can be electrically connected to the apparatus main unit and can receive an ink from the apparatus main unit upon being mounted on the apparatus main unit but also a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

Still further, as a form of a printing apparatus of the present invention, in addition to an independent or integrated image output terminal for an information processing apparatus such as a computer, a copying machine with a reader, and a facsimile machine having a sending/receiving function may be possible.

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

If the present invention is realized as a storage medium, program codes corresponding to the above mentioned flowchart (FIG. 9) is to be stored in the storage medium.

As many apparently widely different embodiments of the present invention can be made without departing from the spirit and scope thereof, it is to be understood that the invention is not limited to the specific embodiments thereof except as defined in the claims.

What is claimed is:

1. A printing apparatus in which a carriage equipped with a printhead having a plurality of printing elements arranged in a predetermined direction is made to scan across a printing medium in a direction that intersects the direction in which the printing elements are arranged, thereby performing printing on the medium, said apparatus comprising:

a receive buffer for receiving print data that has been transmitted in raster form;

a print buffer for storing the data, which has been stored in said receive buffer, in a plurality of areas corresponding to a plurality of blocks each consisting of a predetermined number of successive printing elements;

data shifting means for shifting in a direction in which the printing elements are arranged, in accordance with printing elements used in the scan, the data in the corresponding area of said print buffer;

transmitting means for transmitting the data shifted by said data shifting means to the printhead in accordance with print timings; and control means for setting the amount of the shift based on a distance over which the printing medium is transported after the scan, a flag indicating status of use provided for each area of said print buffer, and an extent of the printing elements used for printing in next scan, wherein the data shifting means is controlled based on the amount of the shift set by the control means.

2. The apparatus according to claim 1, wherein each area of said print buffer stores data to be supplied to printing elements of the predetermined number in one scan.

3. The apparatus according to claim 1, wherein said control means has a table indicating correspondence between the areas of said print buffer and respective ones of the blocks, and said table is updated after each scan.

4. The apparatus according to claim 1, wherein the plurality of areas of said print buffer is at least twice the number of blocks.

5. The apparatus according to claim 1, further comprising print-buffer management means for performing management in such a manner that each area of said print buffer is used cyclically in a predetermined order.

6. The apparatus according to claim 1, wherein a plurality of printheads are mounted on the carriage and each of these printheads performs color printing by printing colors that differ from one another.

7. The apparatus according to claim 6, wherein a plurality of said print buffers are provided in association with each of the printheads.

8. The apparatus according to claim 1, wherein when multiple-pass printing in which each print area is printed by a plurality of scans is performed, transport distance of the printing medium is capable of being set pass by pass.

9. The apparatus according to claim 1, wherein the printing head is an ink-jet printing head which performs printing by ejecting ink.

10. The apparatus according to claim 9, wherein the printhead ejects ink by utilizing thermal energy, said printhead having a thermal energy transducer for generating thermal energy applied to the ink.

11. A printing method for performing printing by causing a carriage equipped with a printhead having a plurality of printing elements arranged in a predetermined direction to scan across a printing medium in a direction that intersects the direction in which the printing elements are arranged, thereby performing printing on the medium, said method comprising:

a receive step of storing print data, which has been transmitted in raster form, in a receive buffer;

a buffer step of storing the data, which has been stored in the receive buffer, in a print buffer having a plurality of areas corresponding to a plurality of blocks each consisting of a predetermined number of successive printing elements;

a data shifting step of shifting in a direction in which the printing elements are arranged, in accordance with printing elements used in the scan, the data in the corresponding area of the print buffer;

a transmit step of transmitting the data shifted by said data shifting step to the printhead in accordance with print timings; and a control step of setting the amount of the shift step based on a distance over which the printing medium is transported after the scan, a flag indicating status of use provided for each area of said print buffer, and an extent of the printing elements used for printing in next scan, wherein the data shifting step is controlled based on the amount of the shift set by the control step.

* * * * *